United States Patent [19]

Miller

[11] Patent Number: 5,692,177

[45] Date of Patent: Nov. 25, 1997

[54] METHOD AND SYSTEM FOR DATA SET STORAGE BY ITERATIVELY SEARCHING FOR PERFECT HASHING FUNCTIONS

[75] Inventor: John Warren Miller, Kirkland, Wash.

[73] Assignee: Microsoft Corporation, Redmond, Wash.

[21] Appl. No.: 329,241

[22] Filed: Oct. 26, 1994

[51] Int. Cl.[6] .................................................. G06F 17/30
[52] U.S. Cl. ........................ 395/608; 395/602; 395/603; 395/617; 395/800; 341/95
[58] Field of Search .............................. 395/600, 575, 395/800, 650, 602, 603, 608, 617; 341/51, 95

[56] References Cited

U.S. PATENT DOCUMENTS

| 5,087,913 | 2/1992 | Eastman | 341/95 |
|---|---|---|---|
| 5,151,697 | 9/1992 | Bunton | 341/51 |
| 5,265,245 | 11/1993 | Nordstrom et al. | 395/600 |
| 5,390,359 | 2/1995 | Damerau | 395/800 |

OTHER PUBLICATIONS

Portice et al., "Perfect Hashing Functions for Hardware Applications", IEEE 1994.
Ramakrishna, "File Organization Using Composite Perfect Hashing". ACM Transactions on Database Systems, vol. 14, No. 2 Jun. 1989.
Lewis et al. "Hashing for dynamic and static internal tables." IEEE, pp. 45–56 Oct. 1988.
Dietzfelbinger et al. "Dynamic Perfect Hashing: Upper and Lower bounds." IEEE, pp. 524–530 1988.
M.V. Ramakrishna, Per-Ake Larson, "File Organization Using Composite Perfect Hashing," *ACM Transactions on Database Systems*, vol. 14, No. 2, pp. 231–263, Jun. 1989.
Andrew W. Appel, Guy J. Jacobson, "The World's Fastest Scrabble Program," *Communications of the ACM*, vol. 31, No. 5, pp. 572–585, May 1988.

*Primary Examiner*—Thomas G. Black
*Assistant Examiner*—Cheryl R. Lewis
*Attorney, Agent, or Firm*—Seed and Berry LLP

[57] ABSTRACT

A storage and retrieval system for storage and retrieval of records in a computer system. In a preferred embodiment, the storage system generates various hashing functions, hashes the keys of the records to identify storage locations, and stores the records in the identified storage locations. The retrieval system retrieves a record for a key by using the hashing functions to identify a storage location and retrieving the data from the identified storage location. The storage system logically organizes storage (e.g., memory) into levels. Each level is further organized into bins, and each bin contains a fixed number of slots. Each slot contains storage for storing one record. The storage system preferably stores about half the records at the first level, a quarter of the records at the second level, and so on. The storage system uses hashing functions and hashes the keys to determine at which level, bin, and slot to store the record associated with the key. The storage system uses a tentative bin assignment hashing function to tentatively assign keys to bins. The storage system then searches for a perfect hashing function for assigning a subset of the tentatively assigned keys to slots within the bin. The storage system generates a definite bin assignment hashing function to identify the subset. The storage system generates a definite bin assignment hashing function and a perfect hashing function for each bin within each level. The retrieval system uses the tentative bin assignment hashing function, the definite bin assignment hashing functions, and the perfect hashing functions to locate records.

70 Claims, 10 Drawing Sheets

| Key | Record | | | |
|---|---|---|---|---|
| | abcdefgh | ijklmnop | qrstuvwx | yz# |
| @ | 01000000 | 00001000 | 00100000 | 00000000 |
| r | 00001000 | 00000000 | 00000000 | 00000000 |
| m | 10000000 | 10000000 | 00000000 | 00000000 |
| b | 10000000 | 10000000 | 00000000 | 00000000 |
| re | 00000000 | 00001000 | 00100000 | 00100000 |
| mi | 00000000 | 00000000 | 00010000 | 00000000 |
| ma | 00000000 | 00000100 | 00000000 | 00000000 |
| bi | 00000000 | 00000000 | 00010000 | 00000000 |
| ba | 00000000 | 00000100 | 00000000 | 00000000 |
| res | 00000000 | 00000000 | 00000000 | 00100000 |
| rem | 10000000 | 10000000 | 00000000 | 00000000 |
| mit | 00000000 | 00000000 | 00000000 | 00100000 |
| man | 00000000 | 00000000 | 00000000 | 00100000 |
| bit | 00000000 | 00000000 | 00000000 | 00100000 |
| bad | 00000000 | 00000000 | 00000000 | 00100000 |
| rest | 00000000 | 00000000 | 00000000 | 00100000 |
| remi | 00000000 | 00000100 | 00000000 | 00000000 |
| rema | 00000000 | 00000100 | 00000000 | 00000000 |
| remin | 00010000 | 00000000 | 00000000 | 00000000 |
| reman | 00010000 | 00000000 | 00000000 | 00000000 |
| remind | 00000000 | 00000000 | 00000000 | 00100000 |
| remand | 00000000 | 00000000 | 00000000 | 00100000 |

METHOD AND SYSTEM FOR DATA SET STORAGE BY ITERATIVELY SEARCHING FOR PERFECT HASHING FUNCTIONS

TECHNICAL FIELD

The invention relates generally to the field of computer data storage and, more specifically, to computer data storage using hashing techniques.

BACKGROUND OF THE INVENTION

Many well-known data organization techniques have been developed to organize a collection of data in a computer system so that the data can be located and retrieved. A collection of data is typically organized into records. Each record typically has an associated key that identifies the record. For example, a department of motor vehicles may maintain a collection of data (a database) about vehicles. The database may contain one record for each vehicle. A record may contain the owner's name, the vehicle license number, and vehicle make and model. The vehicle license number may be designated as the key for the database.

These well-known data organization techniques include direct access tables, sorted tables, tree structures, and hash tables. The choice of which organization technique to use when storing data depends upon the type of access (e.g., read or write) needed, the speed of access needed, and the amount of storage available. For example, if speed of access is important, then the use of a direct access table would allow rapid access. A direct access table contains an entry for each possible value of a key. Each entry contains a record corresponding to the key. A record in a direct access table can be located by using the value of the key as an index into the table. However, since one entry would need to be allocated for each possible key value (e.g., license plate number), whether in use or not, the amount of memory needed may be quite large. Alteratively, if the records were maintained in a sorted table, then the amount of memory needed would be reduced and retrieval time could be fairly quick (e.g., a binary search). However, the time needed to add and delete records would be increased significantly. A sorted table is a list of records that are stored in sorted order based on key value. When a record is added, other records need to be moved to maintain the sorted order.

Using certain of these organization techniques the key must be included in the record, but others do not require that the key be included in the record. For example, when a direct access table is used the key need not be stored in the record because the index into the table is the key itself. Conversely, when a sorted table is used the key is stored in the record for comparison when searching. For large records, the overhead of storing the key with the record may be small. However, if the key is large relative to the size of the record, then the overhead may be large. For example, if the record of the motor vehicle database only contained a flag indicating whether the license plate number is currently assigned to a vehicle, then the overhead of storing the key in the record would be large. If the key is stored in 48 bits (e.g., 6 letters) and the flag is only 1 bit, then when the key is stored in the record the size of the record is increased 48 fold.

Some databases are dynamic databases and other databases are static databases. A dynamic database is one in which records may be added, deleted, or updated. A static database is a database in which data is retrieved from the database and cannot be changed. The motor vehicle database is a dynamic database, that is, records are frequently added and deleted to account for the addition and deletion of vehicles. A dictionary, conversely, is an example of a static database.

SUMMARY OF THE INVENTION

It is an object of the present invention to provide a method and system for data storage.

It is another object of the present invention to provide a method and system for data storage in which keys are not stored with records.

It is another object of the present invention to provide a method and system for data storage in which hashing functions are automatically selected for use in determining storage locations.

These and other objects, which will become apparent as a preferred embodiment is more fully described below, are provided by a method and system for storing data in storage of a computer system. The storage is organized into slots, and each slot includes storage locations for storing a record. In a preferred embodiment, the method selects a number of slots and designates the selected slots as a level. The method then selects which records to store in the slots of the level. The method then selects a perfect hashing function for assigning the selected records to the selected slots based on the keys of the selected records. Using the perfect hashing function, the method assigns the selected records to the selected slots. The method then stores the data for each selected record in the assigned slot. The method repeats this process until all records are assigned to slots.

BRIEF DESCRIPTION OF THE DRAWINGS

FIG. 10 shows each keys and bit arrays for the sample dictionary.

DETAILED DESCRIPTION OF THE INVENTION

The present invention provides a storage and retrieval system for storage and retrieval of records in a computer system. In a preferred embodiment, the storage system generates various hashing functions, hashes the keys of the records to identify storage locations, and stores the records in the identified storage locations. The retrieval system retrieves a record for a key by using the hashing functions to identify a storage location and retrieving the data from the identified storage location. The storage system logically organizes storage (e.g., memory) into levels. Each level is further organized into bins, and each bin contains a fixed number of slots. Each slot contains storage for storing one record. The storage system preferably stores about half the records at the first level, a quarter of the records at the second level, and so on. The storage system uses hashing functions and hashes the keys to determine at which level, bin, and slot to store the record associated with the key. The storage system uses a tentative bin assignment hashing function to tentatively assign keys to bins. The storage system then searches for a perfect hashing function for assigning a subset of the tentatively assigned keys to slots within the bin. The storage system generates a definite bin assignment hashing function to identify the subset. The storage system generates a definite bin assignment hashing function and a perfect hashing function for each bin within each level. The retrieval system uses the tentative bin assignment hashing function, the definite bin assignment hashing functions, and the perfect hashing functions to locate records.

Figure 1:
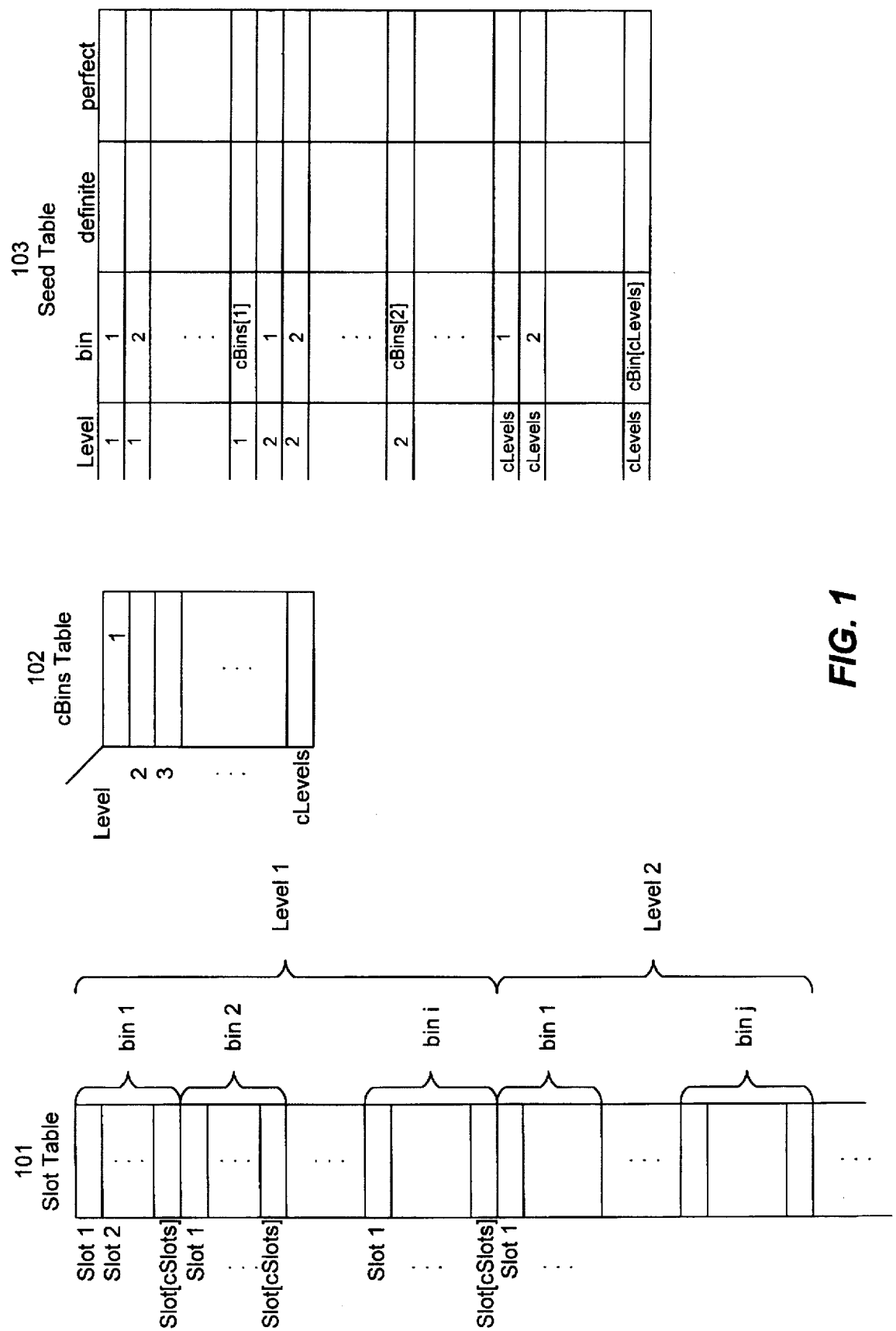
FIG. 1 is a block diagram illustrating the logical organization of memory in a preferred embodiment.

FIG. 1 is a block diagram illustrating the logical organization of memory in a preferred embodiment. The storage system stores the data in slot table 101 and creates the count of bins table 102 and the seed table 103 for use in retrieving the data. The storage system logically divides slot table 101 into various levels. Each level contains a variable number of bins. Each bin contains a fixed number of memory locations. A group of memory locations that contains information for a single record is a slot. A data set is a collection of keys and records. When storing the records of a data set, the storage system assigns a slot to each key in the data set. The storage system assigns slots to keys in the following manner. The storage system determines the number of slots at level 1. The number of slots at any level is preferably approximately the number of keys not yet assigned to a slot divided by two. The number of bins at a level is the number of slots divided by the number of slots per bin. The storage system stores the number of bins for each level in the count of bins table 102 for use in retrieving the data. The count of bins table 102 contains an entry for each level. Once the storage system determines the number of bins that are allocated for a level, it tentatively assigns each unassigned key to a bin according to a hashing function. After each key is tentatively assigned to a bin, the storage system determines which of the keys tentatively assigned to a bin should be assigned to slots within the bin. The storage system uses another hashing function to select some of the tentatively assigned keys to each bin to be definitely assigned to the bin. The storage system then assigns keys to slots using a perfect hashing function that identifies the slot within each bin to which each definitely assigned key is assigned. The keys that are definitely assigned to the bin are selected in such a way that a perfect hashing function is found. The storage system repeats the process at level 2 for all keys that are not yet assigned to a slot. The storage system determines the number of bins at level 2. The storage system then tentatively assigns each unassigned key to a bin within level 2. For each bin within level 2, the storage system definitely assigns certain of the tentatively assigned keys and uses a perfect hashing function to assign the definitely assigned keys to slots within a bin. The storage system repeats this process for each level until all the keys are assigned slots. After a slot is assigned to a key, the record associated with the key is stored within the slot.

The storage system preferably uses several predefined hashing functions and selects other hashing functions as it assigns keys to slots. The storage system preferably uses a predefined hashing function for each level to tentatively assign keys to a slot. The storage system selects, for each bin, a hashing function to definitely assign keys to the bin and a perfect hashing function to assign the definitely assigned keys to slots within the bin. The storage system selects these hashing functions by an iterative process of testing various potential definite bin assignment hashing functions for each bin. For each potential definite bin assignment hashing function, the storage system tests potential perfect hashing functions until one is found that is a perfect hashing function for those keys definitely assigned to the bin by the potential definite bin assignment hashing function. When such a perfect hashing function is found, the storage system uses it and the corresponding definite bin assignment hashing function to assign the keys to slots. The storage system stores in the seed table 103 an indication of the hashing functions selected for use in retrieving the stored records. The seed table 103 contains an entry for each bin in each level. The entries contain two fields: one to identify the definite bin assignment hashing function and the other to identify the perfect hashing function.

Although slot table 101, count of bins table 102, and seed table 103 are illustrated as logically separate data structures, one skilled in the art would appreciate that these data structures could be physically interleaved. For example, each level in memory could be preceded by a field that indicates the number of bins in the level. Also, each bin could be preceded by fields that identify the definite bin assignment hashing function and the perfect hashing function for that bin.

The retrieval system uses the predefined tentative bin assignment hashing functions, the number of bins per level (count of bins table 102), and the stored definite bin assignment hashing function and perfect hashing function (seed table 103) to determine to which slot a key is assigned. To retrieve data, the retrieval system first receives the key. The retrieval system then performs the tentative bin assignment hashing function for level 1 to determine to which bin the key is tentatively assigned. The retrieval system then determines whether the key is definitely assigned to that bin at level 1 by performing the definite bin assignment hashing function for the bin (as indicated in the seed table 103) to which the key is tentatively assigned. If the key is definitely assigned to that bin at level 1, then the retrieval system performs the perfect hashing function for that bin (as indicated by seed table 103) to determine to which slot the key is assigned. The retrieval system then retrieves the data from the slot. If, however, the key is not definitely assigned to that bin in level 1, the retrieval system repeats the process at level 2 and each subsequent level until the slot to which the key is assigned is located. When the assigned slot is located, the retrieval system retrieves the record for the key from the slot.

In a preferred embodiment, the storage system uses random number generators as hashing functions. A random number generator is a function that returns a number that is randomly selected from a range of numbers. The following is a typical random number generator function:

random_number=Random (lower_bound, upper_bound)

When the function Random is invoked, it is passed a lower bound and an upper bound of the range from which to select a random number. Random number generators are discussed in Knuth, D., "The Art of Computer Programming—Seminumerical Algorithms," Vol. II, pp. 1-177, 1981.

Random number generators are typically passed seed values and always produce the same random number for a given seed value. Given a fully specified starting state and input parameters, a random number generator (or more generally any computer algorithm) will generate the same output repeatedly unless the starting state or input parameters are changed. To generate a sequence of apparently random numbers, a random number generator has a state variable called a seed which is modified so that each call to the random number generator creates a new random number. For this reason, a random number generator can be viewed as a function that is passed a seed and creates a random number such that any two generated random numbers are effectively unrelated to each other unless their seeds are identical. Two invocations to a random number generation with identical seeds produce the identical "random" number. The following example shows the parameters used by a random number generator:

random_number=Random (seed, lower_bound, upper_bound)

More generally, a random number generator can be designed to be passed multiple seeds so that the generated numbers are random, except when the seeds are the same.

random_number=Random (seed1, seed2, seed3, upper_bound, lower_bound)

The storage system uses three random number generators: TentBinAssign, DefBinAssign, and SlotAssign. Below are the names and parameters for these random number generators.

--- int TentBinAssign (key, level, lower_bound, upper_bound)
int DefBinAssign (key, level, definite, lower_bound, upper_bound)
int SlotAssign (key, level, definite, perfect, lower_bound, upper_bound)

---

The input parameters key, level, definite, and perfect are all seeds that are input to the random number generators.

The storage system uses the function TentBinAssign to tentatively assign the keys to bins at each level. The storage system uses the function DefBinAssign to definitely assign certain of the keys that are tentatively assigned to a bin. The storage system uses the SlotAssign function as a perfect hashing function to uniquely assign each key (that is definitely assigned to a bin) to a slot within the bin. When the storage system selects the definite bin assignment hashing function and the perfect hashing function for a bin, it tests various combinations of values for the parameters definite and perfect until such a combination results in the SlotAssign function being a perfect hashing function for the keys.

Figure 2:
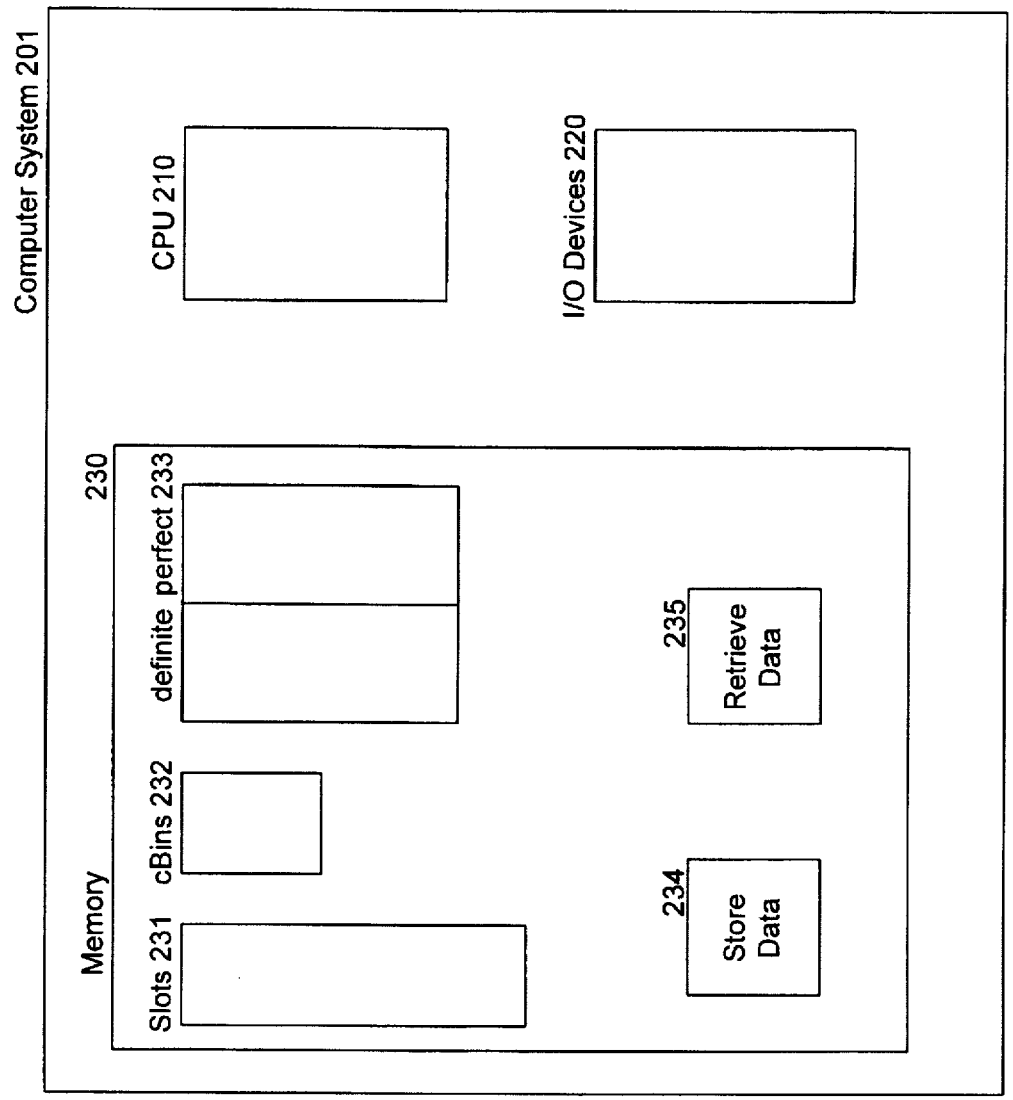
FIG. 2 is a block diagram of a computer system for practicing a preferred embodiment of the present invention.

FIG. 2 is a block diagram of a computer system for practicing a preferred embodiment of the present invention. The computer system 201 comprises central processing unit (CPU) 210, input/output devices 220, and memory 230. The memory contains the slot table 101, count of bins (cBins) table 102, a seed table 103, and a stored data function 234 and a retrieve data function 235. The CPU executes the store data and the retrieve data functions to process the data in the tables. The slot table 101 contains the data (records) for each key, the count of bins table 102 contains the number of bins in each level, and the seed table 103 contains the seed values definite and perfect used as parameters for the DefBinAssign and SlotAssign functions, which are invoked by the store data and retrieve data functions. The seed table is an array that contains an entry for each bin. Each entry contains a definite and perfect seed value for the bin. The seed table is logically indexed by level and bin.

Figure 3:
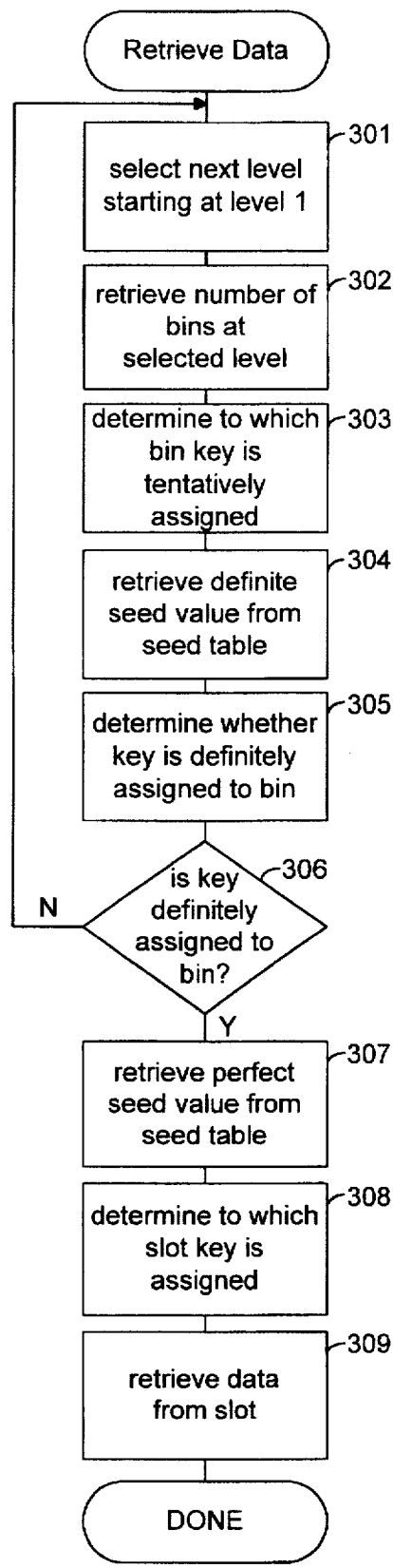
FIG. 3 is an overview flow diagram of the retrieve data function.

FIG. 3 is an overview flow diagram of the retrieve data function. The retrieve data function is passed a key, determines which slot is assigned to the passed key, and returns the data in the slot. The retrieve data function uses the count of bins table 102 and the seed table 103 to determine which slot is assigned to the passed key. In steps 301 through 306, the retrieve data function loops until it determines to which bin at which level the passed key is definitely assigned. In step 301, the retrieve data function selects the next level starting at level 1. In step 302, the retrieve data function retrieves the number of bins that are allocated for the selected level from the count of bins table. In step 303, the retrieve data function determines to which bin of the selected level the passed key is tentatively assigned by using the TentBinAssign function passing the passed key, the selected level, and one and the retrieved number of bins as the lower and upper bounds. In step 304, the retrieve data function retrieves a definite seed value from the seed table for use in determining whether the passed key is definitely assigned to the determined bin. In step 305, the retrieve data function determines whether the passed key is definitely assigned to the determined bin. The retrieve data function invokes the DefBinAssign function passing the passed key, selected level, retrieved definite seed value, and 0 and 255 as the lower and upper bounds. If the result is less than a threshold value of 128, then the passed key is definitely assigned to the determined bin. The selection of the combination of 0 and 255 as the upper and lower bounds and a threshold value of 128 are discussed below in detail. In step 306, if the passed key is definitely assigned to the determined bin, then the retrieve data function determines to which slot the passed key is assigned by continuing at step 307, else the retrieve data function loops to step 301 to check the next level. In step 307, the retrieve data function retrieves the perfect seed value for the determined bin at the selected level from the seed table. In step 308, the retrieve function determines to which slot the passed key is assigned by invoking the SlotAssign function passing the passed key, the selected level, the retrieved definite and perfect seed values, and 1 and the count of slots per bin as the lower and upper bounds. In step 309, the retrieve data function retrieves the data for the passed key from the determined slot and completes its processing.

Figure 4:
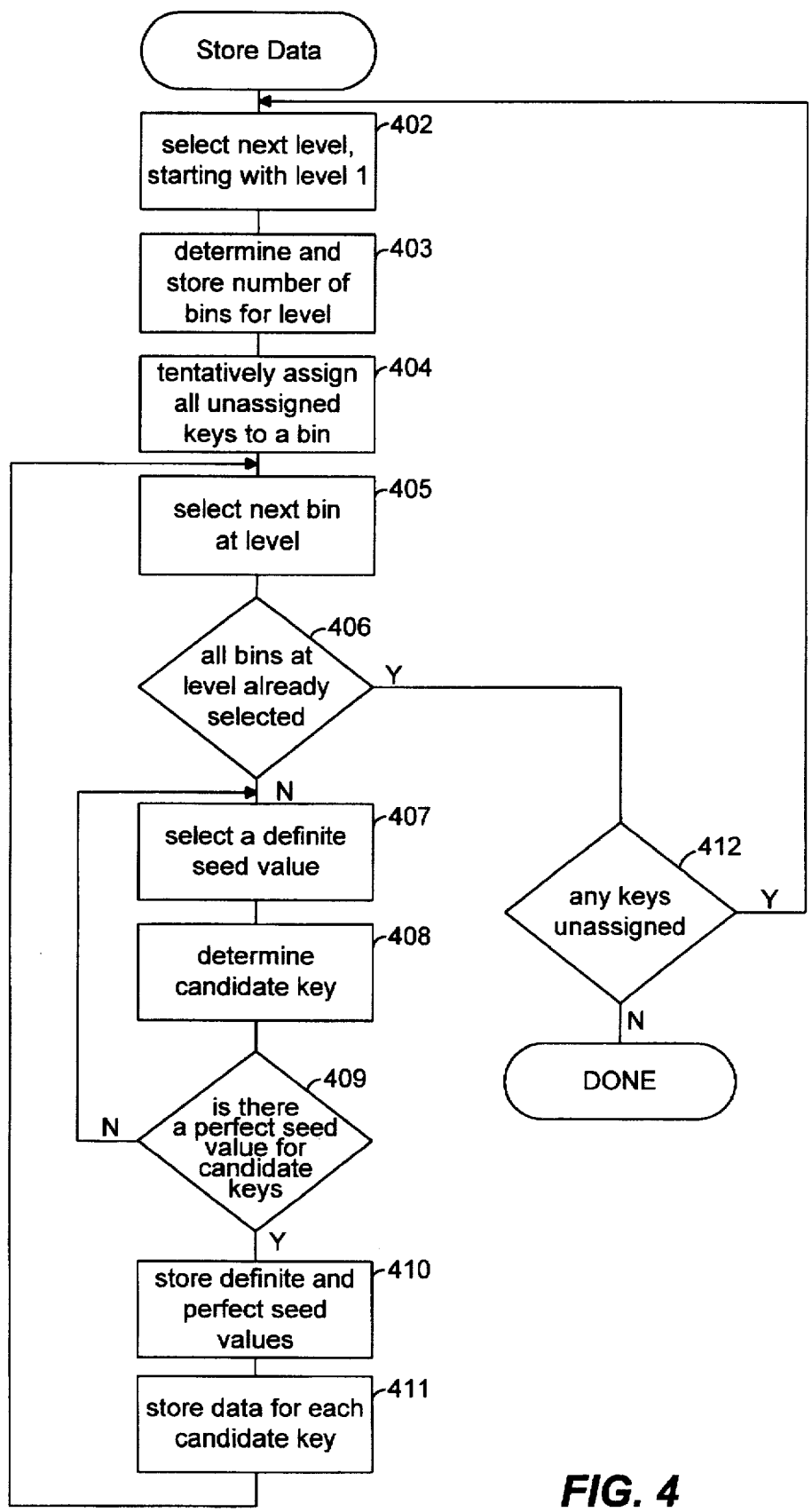
FIG. 4 is an overview flow diagram of the store data function.

FIG. 4 is an overview flow diagram of the store data function. The store data function inputs a set of keys and corresponding data (records). The store data function assigns each key to a slot and stores the data into the assigned slot. The store data function generates a count of bins per level and a definite seed value and perfect seed value for each bin within each level. In step 402 through 413, the store data function loops through successive levels, tentatively assigns keys to bins, selects a definite seed value and a perfect seed value for each bin within each level, and stores the data for each key into its assigned slot. In step 402, the store data function selects the next level, starting with level 1. In step 403, the store data function determines the number of bins that should be allocated for the selected level and stores the number of bins in the count of bins table. In step 404, the store data function tentatively assigns all the unassigned keys to bins at the selected level. The store data function tentatively assigns the keys by invoking the TentBinAssign function for each key passing the key, the selected level, and 1 and the determined number of bins as the lower and upper bounds. The unassigned keys are those keys that have not yet been assigned to a slot; initially all the keys are unassigned. In steps 405 through 411, the store data function loops through each bin at the selected level, definitely assigns certain keys to bins by selecting a definite seed value, and assigns each definitely assigned key to a unique slot by selecting a perfect seed value that results in the SlotAssign function being a perfect hashing function for those keys that are definitely assigned the selected bin. In step 405, the store data function selects the next bin at the selected level starting with the first bin at the selected level.

In step 406, if all bins at the selected level have already been selected, then the store data function continues at step 412 to process the unassigned keys at the next level, else the store data function continues at step 407. In steps 407 through 409, the store data function loops selecting various definite seed values until a perfect seed value is found for those keys that would be definitely assigned to the selected bin for the selected definite seed value. In step 407, the store data function selects a definite seed value. In step 408, the store data function performs the DefBinAssign function for each key tentatively assigned to the selected level passing the key, the selected level, the selected definite seed value, and 0 and 255 as the lower and upper bounds. The keys for which the result of the DefBinAssign function is less than the threshold value of 128 are considered to be candidate keys, and these candidate keys will be assigned a slot at the selected bin only if a perfect seed value is found for the candidate keys. In step 409, if a perfect seed value is found for these candidate keys, then the function continues at step 410, else the function loops to select another definite seed value that will generate a different set of candidate keys in step 407. In step 410, the store data function stores the selected definite seed value and the selected perfect seed value in the seed table for use in retrieving the data. In step 411, the store data function stores the data for each candidate key in a slot of the selected bin as assigned by the SlotAssign function, and loops to step 405 to select the next bin at the selected level. The store data function determines whether there is a perfect seed value for the SlotAssign function that results in a perfect hashing function by invoking the SlotAssign function for each possible perfect seed value until a perfect seed value that results in a perfect hashing function is found. For each possible perfect seed value, the SlotAssign function is invoked once for each candidate key to determine whether a slot collision occurs. If a slot collision occurs, then the possible perfect seed value does not result in a perfect hashing function for the candidate keys. If a perfect seed value is found, then all the candidate keys are definitely assigned to the bin and assigned to a slot within the bin. In step 412, if them are any unassigned keys, then the store data function loops to step 402 to select the next level, else the store data function is complete.

Figure 5:
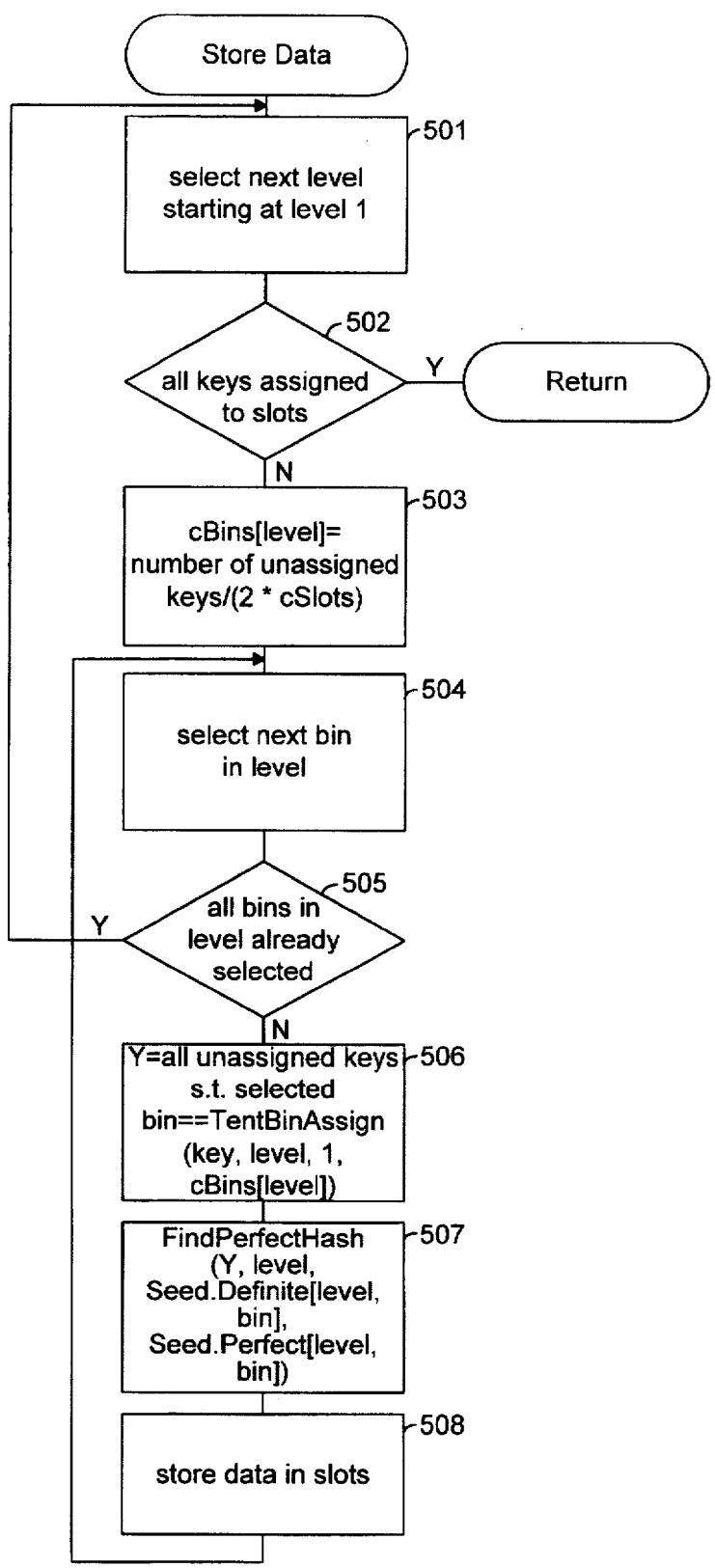
FIG. 5 is a detailed flow diagram of the store data function of FIG. 4.

FIG. 5 is a detailed flow diagram of the store data function of FIG. 4. The store data function is passed the keys and associated data, assigns a slot to each key, stores the data in the slot, and returns the count of the number of bins at each level, and the definite and perfect seed values for each bin at each level. In step 501, the store data function selects the next level starting with level 1. In step 502, if all the keys have been assigned to slots, then the store data function returns, else the store data function continues at step 503. In step 503, the store data function calculates the number of bins to be allocated for the selected level. The number of bins allocated is preferably the number of unassigned keys divided by the result of two times the number of slots per bin rounded up to the next integral number. The number of slots per bin is preferably the same for each level. In steps 504 through 508, the store data function loops tentatively assigning keys to bins and searching for a definite seed value for which there is a perfect seed value that results in a perfect hashing function. In step 504, the store data function selects the next bin in the selected level starting with the first bin. In step 505, if all the bins have already been selected in the selected level, then the store data function loops to step 501 to select the next level, else the store data function continues at step 506. In step 506, the store data function determines which keys are tentatively assigned to the selected bin. The store data function invokes for each key the TentBinAssign function passing the key, the selected level, and 1 and the number of bins at the selected level as the lower and upper bounds. In step 507, the store data function invokes the FindPerfectHash function, which finds definite seed value and a perfect seed value that results in a perfect hashing function for the key definitely assigned to the selected bin. In step 508, the store data function, for each key definitely assigned to the selected bin, stores the data in the assigned slot and loops to step 504 to select the next bin.

In an alternate embodiment, after step 503, the TentBinAssign function can be performed for each unassigned key. The tentative bin assignments are then sorted. In step 506, rather than recalculate the TentBinAssign function, the keys tentatively assigned to a selected bin can be retrieved from the sorted list.

Figure 6:
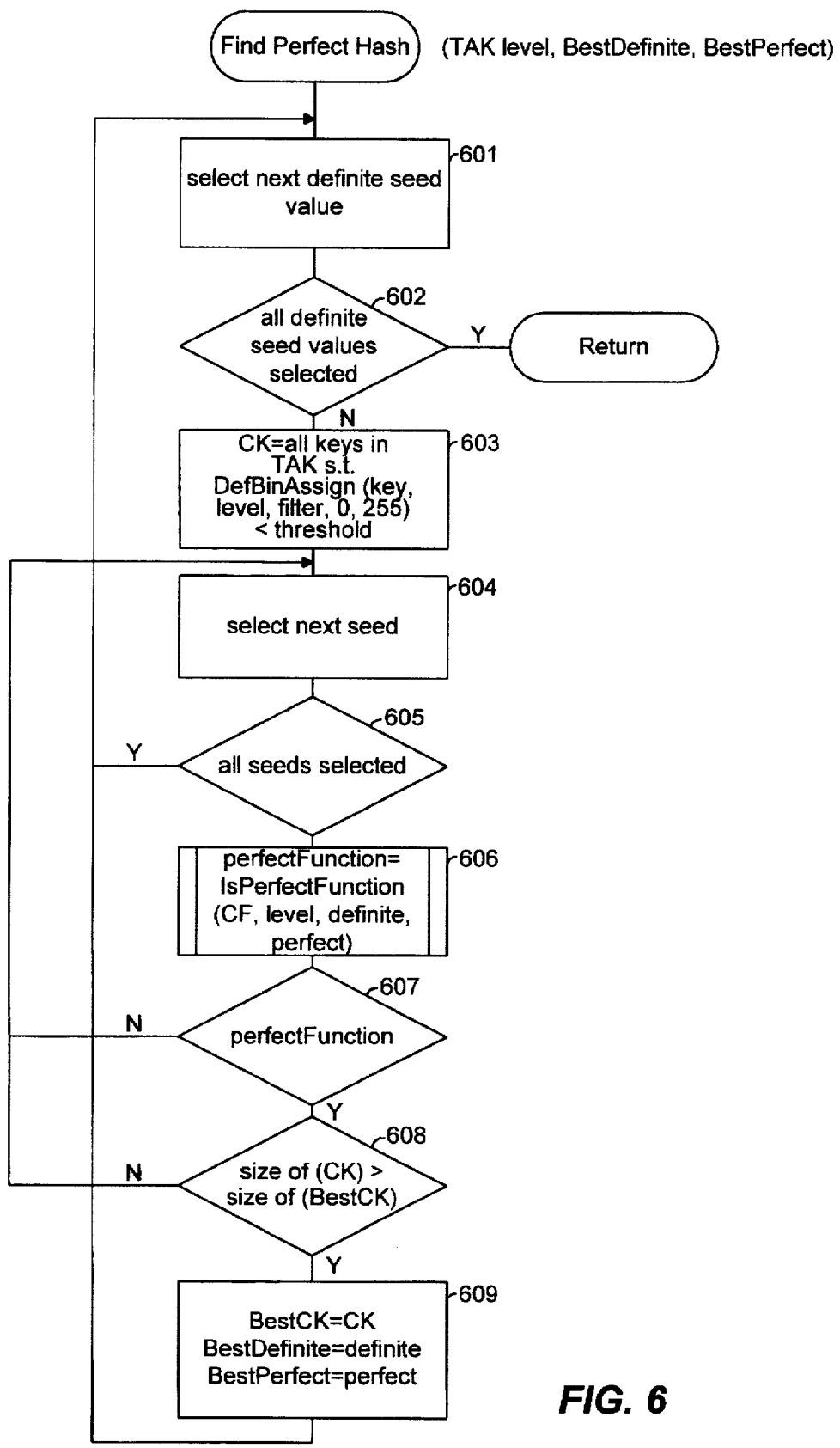
FIG. 6 is a flow diagram of the FindPerfectHash function.

FIG. 6 is a flow diagram of the FindPerfectHash function. The FindPerfectHash function is passed the set of tentatively assigned keys (TAK) to a bin and the level number of the bin, assigns keys to slots, and returns the definite and perfect seed values for the bin. In step 601, the FindPerfectHash function selects the next definite seed value starting with the first definite seed value. In step 602, if all the definite seed values have already been selected, then the FindPerfectHash function returns, else the FindPerfectHash function continues at step 603. The definite seed values are preferably selected in numerical order. In step 603, the FindPerfectHash function determines which keys are candidate keys (CK) for the bin based on the selected definite seed value. The FindPerfectHash function invokes the DefBinAssign function (for each tentatively assigned key to the bin) passing the key, level, and selected definite seed value, and 0 and 255 as the lower and upper bounds. The candidate keys are those keys for which the DefBinAssign function returns a value less than a threshold value. The threshold value is preferably selected to be 128. However, a variable threshold value can be used to ensure that an increasingly smaller number of candidate keys are used to determine whether a perfect hashing function can be found. The threshold values are preferably stored in a threshold array that is indexed by the definite seed value. The threshold array preferably contains values starting with 255 and decreasing to 0. When the threshold value is 255, then the storage system tries to find a perfect hash function for all keys that are tentatively assigned to the bin. When the threshold function is 0, then no keys are definitely assigned to the bin. Alternatively, the entries of the threshold array contain a mean value of 128 and contain a bell-shaped histogram of values. The different threshold values modulate the number of keys for which a perfect hashing function is attempted to be found. Thus, many attempts are made to find a perfect hashing function for approximately half the key tentatively assigned to the bin. One skilled in the art would appreciate that values other than in range of 0 and 255 can be used.

In steps 604 through 609, the FindPerfectHash function loops checking each of the perfect seed values to determine whether a perfect hashing function can be found for the corresponding candidate keys. In step 604, the FindPerfectHash function selects the next perfect seed value starting with the first perfect seed value. In step 605, if all the perfect seed values have already been selected, then the FindPerfectHash function loops to step 601 to select the next definite seed value, else the FindPerfectHash function continues at step 606. The perfect seed values are preferably selected in numerical order. In step 606, the FindPerfectHash function determines whether the level, selected definite seed value, and selected perfect seed value when passed to the SlotAssign function results in a perfect hashing function for the candidate keys. In step 607, if the result is a perfect hashing function, then the FindPerfectHash function continues at step 608, else the FindPerfectHash function loops to step 604 to select the next perfect seed value. In step 608, if the number of candidate keys is greater than the highest number of candidate keys with a perfect hashing function already found, then the FindPerfectHash function continues at step 609, else the FindPerfectHash function loops to step 604 to select the next perfect seed value. In step 609, the FindPerfectHash function resets the indicators of the best set of candidate keys, best definite seed value, and best perfect seed value and loops to step 601 to select the next definite seed value.

The FindPerfectHash function searches for the perfect seed value that results in the maximum number of keys definitely assigned to a bin. Alternatively, the speed of the storage system can be increased by searching for only the first perfect seed value encountered, rather than the best.

Figure 7:
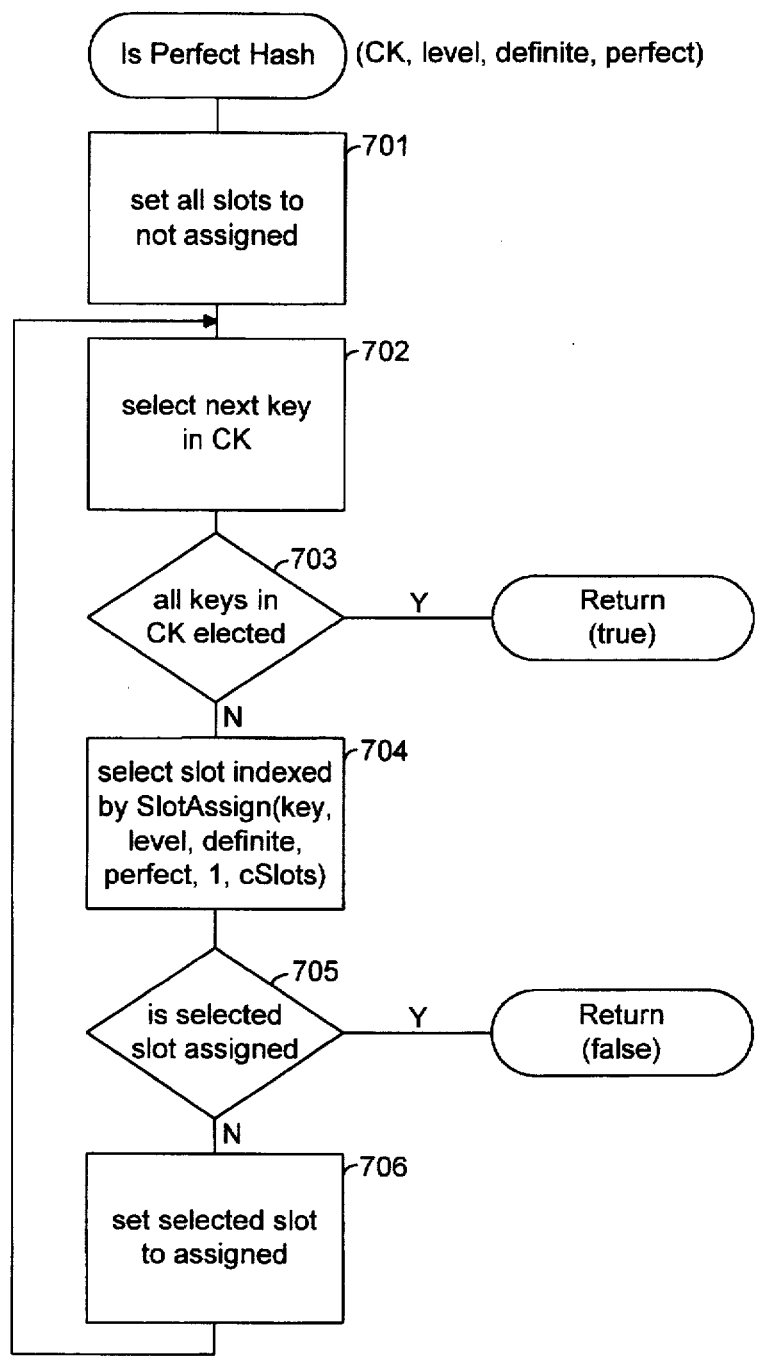
FIG. 7 is a flow diagram of the IsPerfectHash function.

FIG. 7 is a flow diagram of the IsPerfectHash function. The IsPerfectHash function determines whether the SlotAssign function when passed the level, definite seed value, and perfect seed value is a perfect hashing function for the passed candidate keys. If the SlotAssign function is a perfect hashing function, then the IsPerfectHash function returns true, else it returns false. In steps 701 through 706, the IsPerfectHash function loops determining whether each key in the passed set of candidate keys (CK) is mapped by the SlotAssign function to a unique slot in the bin at the passed level. In step 701, the IsPerfectHash function sets all slots within the bin to not assigned. In step 702, the IsPerfectHash function selects the next key in the passed set, starting with the first key. In step 703, if all the keys in the passed set have already been selected, then the IsPerfectHash function returns with a value of true indicating that the SlotAssign function when passed the level, definite seed value, and perfect seed value is a perfect hashing function for the passed set of keys, else the IsPerfectHash function continues at step 704. In step 704, the IsPerfectHash function performs the SlotAssign function passing the selected key, level, definite seed value, perfect seed value, and 1 and number of slots per bins as the lower and upper bounds. The IsPerfectHash function then selects the slot indicated by the result of the SlotAssign function. In step 705, if the selected slot has already been assigned to another key, then the IsPerfectHash function returns with a value of false indicating that the SlotAssign function is not a perfect hashing function for the set of keys when passed the definite seed value and the perfect seed value, else the IsPerfectHash function continues at step 706. In step 706, the IsPerfectHash function sets the selected slot to assigned and loops to step 702 to select the next key.

Figure 8:
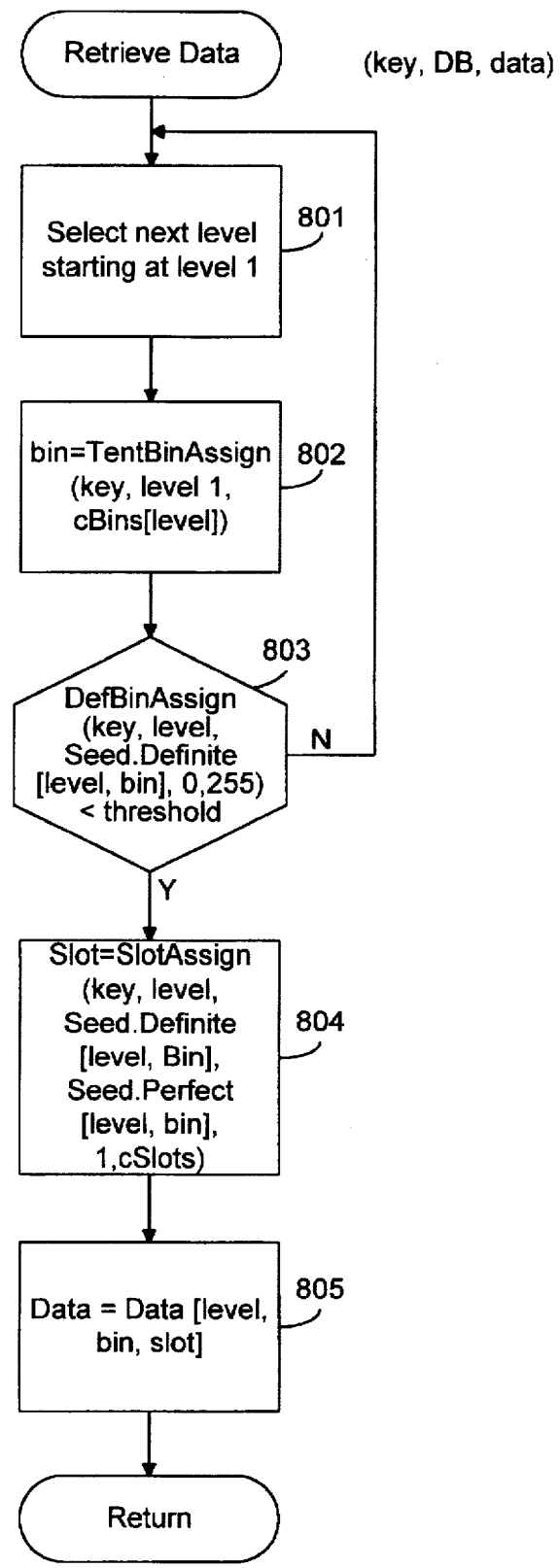
FIG. 8 is a detailed flow diagram of the retrieve data function.

FIG. 8 is a detailed flow diagram of the retrieve data function. The retrieve data function is passed a key, retrieves the data corresponding to the key from the passed database, and returns the data. The passed database (DB) includes the slots table, count of bins table, and seed table. In steps 801 through 804, the retrieve data function loops determining at which level the passed key is assigned a slot. In step 801, the retrieve data function selects the next level starting with level 1. In step 802, the retrieve data function determines the bin to which the key is tentatively assigned in the selected level by invoking the TentBinAssign function passing the key, the selected level, and 1 and the number of bins in the selected level as the lower and upper bounds. In step 803, the retrieve data function determines whether the key is definitely assigned to the bin by invoking the DefBinAssign function passing the key, the selected level, the definite seed value for the determined bin at the selected level, and 0 and 255 as the lower and upper bounds. If the result of the DefBinAssign function is less than the threshold value, then the retrieve data function continues at step 804, else the retrieve data function loops to step 801 to select the next level. As discussed above, if a threshold array is used by the store data function, then the threshold array is also used in step 803. In step 804, the retrieve data function determines the slot to which the key is assigned by invoking the SlotAssign function passing the key, the selected level, the definite seed value, the perfect seed value for the selected level and determined bin, and 1 and the number of slots per bin as lower and upper bounds. In step 805, the retrieve data function retrieves the data for the key from the determined slot and returns.

The number of bits allocated to the definite and perfect seed values is preferably as large as computationally reasonable. In a preferred embodiment, a definite seed value of 8 bits and a perfect seed value of 16 bits is used. The number of slots per bin should be approximately ln(2) times the total number of bits used for the definite and perfect seed values. The number of slots per bin is preferably 16. Various settings for these parameters can be quickly tested empirically or studied analytically by modeling the number of keys mapped into the bin as a Poisson distribution. Given this number of keys, the test to find perfect mappings can be modeled as independent identically distributed trials. This analysis may be used to adjust the threshold array to minimize the overhead for a given record size.

Figure 9:
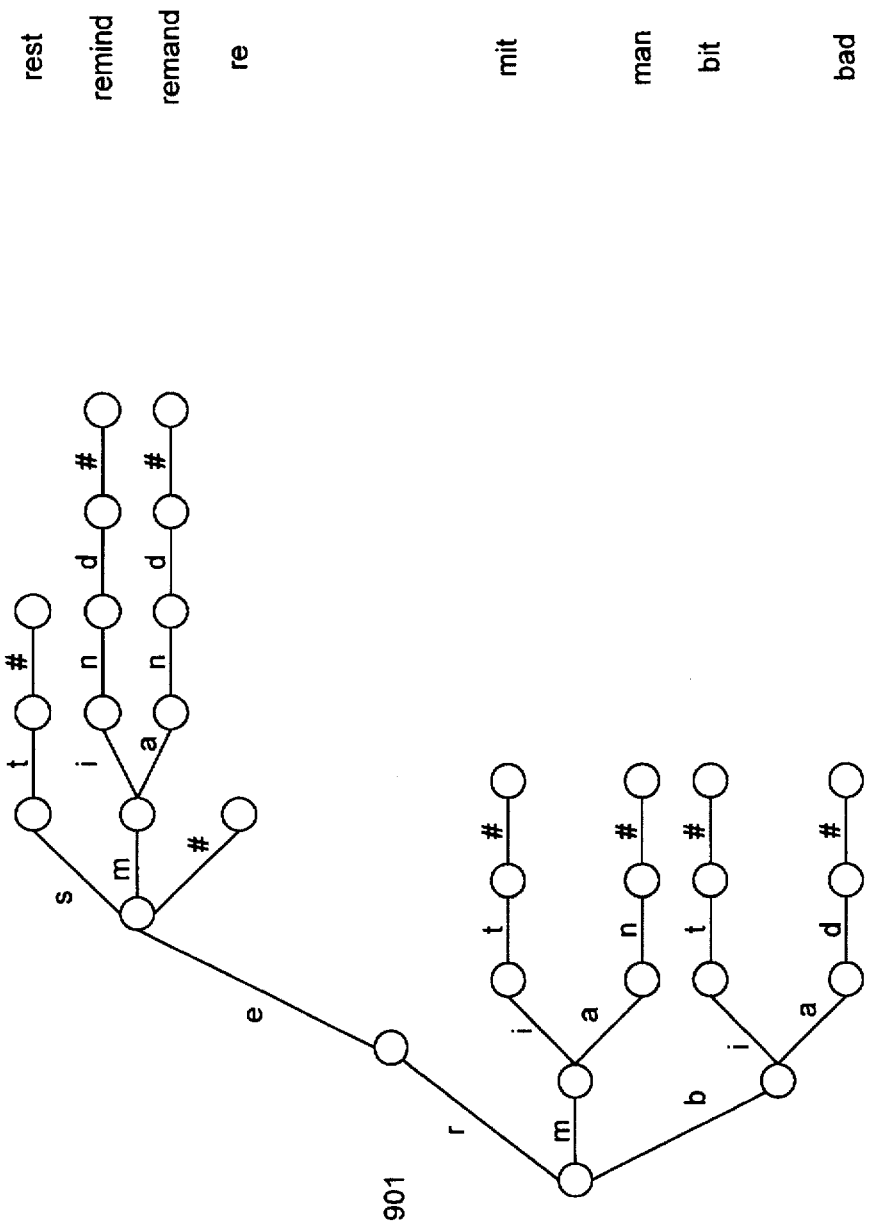
FIG. 9 illustrates a portion of a sample dictionary stored as a tree data structure.

The present invention is particularly useful for storage and retrieval of static data sets. There are many uses for static data sets, which include storage of dictionaries and storage of data on read-only devices. The storage system of the present invention may be used for storage of a dictionary for use in handwriting recognition. During handwriting recognition, it is helpful if the recognizer knows what are the possible next characters. For example, if the letters "th" are recognized at the start of a word, it helps the recognition process to know that only the letters "aeioruwy" could immediately follow the letters "th" at the start of a word. A dictionary stored as a tree data structure logically represents the possible successor letters of each possible word prefix. FIG. 9 illustrates a portion of a dictionary stored as a tree data structure. The tree 901 represents the following words:
bad
bit
man
mit
re
remand
remind
rest The tree 901 contains vertices and edges. The edges are labeled with the letters of the words. The path from the root vertex to a leaf vertex represents the complete spelling of a word. The edge to each leaf vertex is labeled with "#" to indicate the end of a word.

During handwriting recognition, the recognizer follows the path in the tree indicated by the recognized characters. At each vertex, the edges leaving the vertex indicate the possible immediate successor characters. Although traversal of a tree data structure can be done quickly, the amount of storage needed to store a tree data structure can be large. For example, if each vertex contained an entry for each of the 26 letters in the alphabet, then just to represent all possible combinations of 5 character strings would require 26^5 (almost 12 million) entries.

Techniques have been developed to represent such trees using less memory. However, the speed of access of the data may be unacceptably slow. The storage of one such technique is shown in data structure 902. Data structure 902 represents the tree as the vertices are encountered on a breadth-first traversal. To determine which letters immediately follow an "r" that begins a word, then the characters "ai" and "ai" must first be read to find the "e" that is the only possible successor letter. Thus, although the tree is represented compactly, all vertices at each level must be read as the tree is traversed.

The present invention can be used to store the tree compactly and still allow for rapid retrieval of the data. Each possible prefix has associated with it a bit array indicating its immediate successor letters. For example, a bit array of 4 bytes (32 bits) can be used to represent the immediate successor letters of each possible suffix. The bit array for the suffix "re" is

| abcdefgh | ijklmnop | qrstuvwx | yz# |
|----------|----------|----------|----------|
| 00000000 | 00001000 | 00100000 | 00100000 | which indicates that the letters "ms#" are the immediate successor letters of "re." (The letters above the bit array indicate the correspondence between bit and letter.) To represent the tree, the bit array for each possible suffix is generated. A special start of word character "@" is defined to indicate which letters start a word. The "#" is the end of word character. FIG. 10 shows each key with its corresponding bit array.

Once the bit arrays are generated, the storage system is used to store the bit arrays in memory. The count of bins table and seed table are generated.

Once the prefix data is stored, the retrieval system can be used to efficiently retrieve data during handwriting recognition. For example, if the characters "re" are recognized, the recognizer invokes the retrieve data routine passing "re" as the key. The retrieve data routine returns the above bit array, which indicates that "ms#" are the immediate successor letters of "re." The recognizer can then ensure that the next character is either the letters "m" or "s" or an end-of-word character, such as a blank or a punctuation mark.

Several optimization techniques can be used to store the prefix tree even more compactly. One such technique represents common suffixes as a single bit in the bit array. Since the last 5 bits of the bit array are unused, these bits can be used to represent common suffixes. For example, the common suffix "ing" could be represented as the 28th bit in the bit array.

Another optimization technique represents the bit arrays as Huffman codes. For example, a Huffman code could be generated for each letter. The Huffman codes could be based on the frequency of the bit arrays associated with prefixes that end in the letter. For example, since each prefix that ends in a "q" is almost always followed only by a "u," the bit arrays for such prefixes can be efficiently represented with a Huffman code. Moreover, since most computers are byte-oriented, it may be preferable to represent the Huffman codes as multiples of 4 bits. To accommodate this, multiple new keys would be generated from each original key. Each new key represents one of the 4 bits that comprise the Huffman code. For example, if the Huffman code representing the bit array for "re" is 12 bits long, then the keys "re1," "re2," and "re3" are used to store and retrieve the Huffman code. Also, separate Huffman codes can be used for the first few letters of words. The separate Huffman code would account for the different statistics for beginning of words.

Another optimization technique uses fixed-length keys, rather than the variable length keys. The fixed-length keys are generated by hashing the variable-length keys. A perfect hashing function to generate the fixed-length keys can be found fairly quickly when the fixed length has a number of bits that is approximately 2*log(number of keys)/log(2). A quadratic residue hashing function is preferably used to generate the fixed-length keys.

Another optimization is that a hashing function using bit masks and shifting operations can be used when the bin and level sizes are selected to be a power of 2.

When finding a perfect hashing function, the algorithm rejects a potential algorithm when a collision occurs. However, if a collision occurs but the data for the colliding keys are identical, then the collision can be ignored. That is, different keys with the same data will be assigned to the same slot. Although the resulting hashing function is not perfect, the data retrieved will be correct. Thus, this optimization technique saves space by hashing different keys to the same slot when their data is identical.

The use of these non-perfect hashing functions can significantly reduce space when the records are relatively short, because many different keys may have the same record data. If the records are only 4 bits in length, then 16 slots per bin can be used to represent every possible data value. Similarly, if the records are only 1 bit in length, then 2 slots per bin can be used.

A further optimization can be used when the records are 1 bit in length. If there are 2 slots per bin, then the retrieve data function will return a 0 or a 1 to identify the first or second slot. However, when storing the data, if the first slot is constrained to always contain a 0 and the second slot is constrained to always contain a 1, then the slot address corresponds to the stored data. Consequently, there is no need to store the data in the slots. More specifically, step 309 of the retrieve data function and step 411 of the store data function can be eliminated. The slot table can also be eliminated.

The storage system can also be used to store variable length records. When variable length records are stored, each key can be mapped to multiple keys that identify portions of the variable length records. For example, as discussed above, if the variable-length records contain Huffman codes, the portions of the Huffman code can be stored separately. In fact, each bit of the record can be stored separately with a key generated for each bit of each variable-length record.

It should be noted that the techniques of the present invention can be used to retrieve data for each key that was known at the time of data storage. However, the retrieve data function will, in general, return arbitrary data for an invalid key. For example, the data structures corresponding to the tree 901 are accessed passing the key "red," then retrieve data function will, in general, return arbitrary data.

The data structures generated by the present invention produce both highly compressed and highly encrypted data sets. For example, when variable-length data records are implicitly stored one bit at a time, the resulting data is simply the number of bins per level and the definite and perfect seed values. Thus, the resulting data has a virtually indecipherable relationship to the data it represents. The keys in the data set are naturally very secure from eavesdropping because they are not stored in the data set, whereas the indecipherability of the records depends on the keys being secret. The data structures can be revealed to different users with different keys without any user being able to decode another user's information without the other user's key. For example, the grades for all students in a class could be stored with each student's social security number as the key. Any student could use the algorithm to find their grade, but could not find the grades for another student unless the student knew the other student's social security number. The grades of the other students are essentially indecipherable, although by trying random keys statistical averages about the entire class could be determined.

The hashing functions each are passed the parameters key and level. In an alternate embodiment, as each level is increased, a hashing function is used to generate a new key which is passed to the hashing functions, rather than the key and level. The new key is generated as follows:

key=hash(key)

The use of this hashing function tends to randomize the parameters passed to the other hashing functions, which results in a better chance of finding a perfect hashing function. Also, the result of the TentBinAssign function can be used as an input parameter, replacing the parameters key and level, in the DefBinAssign function. Also, the result of the DefBinAssign function can be used as an input parameter, replacing the parameters key, level, and definite, in the SlotAssign function.

Also, to improve speed of access, the number of bins at each level can be increased and the threshold array adjusted appropriately. In this way, records for more keys will be stored in the first level. However, this will tend to increase the amount of storage needed.

Although the methods and systems of the present invention have been disclosed and described herein primarily with respect to preferred embodiments, the invention is not limited to such embodiments. Rather, the present invention is defined by the following claims.

I claim:

1. A method in a computer system for storing data in storage of the computer system, the data organized into records, each record having a key, the storage organized into slots, each slot for storing a record, the method comprising the computer-implemented steps of:

selecting a number of slots and designating the selected slots as a level;

iteratively selecting from among the records not yet assigned to slots different sets of records to store into the slots of the level and searching for a perfect hashing function for assigning the selected records to the slots of the level based on the keys of the selected records until a perfect hashing function is found and selected;

assigning the selected records to the selected slots in accordance with the selected perfect hashing function;

storing each selected record in its assigned slot; and repeating the above steps for records not yet assigned to a slot until all the records are assigned to a slot.

2. The method of claim 1 wherein the keys are variable length and including the step of mapping the variable length keys to fixed length keys using a perfect hashing function.

3. The method of claim 2 wherein the fixed length key has a number of bits that is approximately equal to 2* log(number of keys)/log(2).

4. The method of claim 1 wherein the number of slots in a level is a power of two.

5. The method of claim 1 including the step of storing an indication of each perfect hashing function selected.

6. The method of claim 1 wherein each record contains one of two values and each level contains two slots, wherein the step of selecting a perfect hashing function for assigning the selected records to the selected slots includes the step of selecting a perfect hashing function such that all selected records of one value are assigned to one slot and all selected records of the other value are assigned to the other slot, and including the step of suppressing storing each selected record in an assigned slot.

7. The method of claim 1 including the step of selecting a perfect hashing function for assigning the selected records to the selected slots includes the step of selecting a non-perfect hashing function when records with the same data hash to the same slot.

8. The method of claim 1 wherein the records are variable length, and before repeating the steps logically dividing each record into fixed length sub-records and generating a sub-key for each key and repeating the steps using the sub-keys and sub-records.

9. The method of claim 1 wherein the step of selecting records to store in the slots of the level and a perfect hashing function further includes the steps of:

logically dividing the level into bins, each bin having a plurality of slots;

assigning each of the selected records to a bin; and for each bin, selecting a perfect hashing function for assigning the records assigned to the bin to slots within the bin.

10. The method of claim 1 wherein the step of selecting records to store in the slots of the level includes the step of searching for a selection function for selecting the records.

11. A method in a computer system for storing data in storage of the computer system, the data organized into records, each record having a key, the storage organized into slots, each slot for storing a record, the method comprising the computer-implemented steps of:

repeating the following steps until each record is stored in a slot, selecting a number of slots and designating the selected slots as a level, the slots within a level being organized into bins; and for each bin of the level, iteratively selecting records to store in the slots of the bin and searching for a slot assignment function for assigning the selected records to the slots of the bin based on the keys;

assigning the selected records to the slots of the bin in accordance with the selected slot assignment function;

storing the selected record in its assigned slot; and storing an indication of the selected slot assignment function.

12. The method of claim 11 wherein the step of selecting records and a slot assignment function includes the steps of iteratively selecting various sets of records to store into the slots of the bin until a perfect hashing function for the selected set of records is found.

13. The method of claim 12 wherein the step of selecting various sets of records includes selecting a generally decreasing number of records to facilitate the selecting of a perfect hashing function.

14. The method of claim 11 including the step of for each bin of the level, tentatively assigning each record not yet stored in an assigned slot to a bin and wherein the step of selecting records to store in the slots of the bin selects records from the records tentatively assigned to the bin.

15. The method of claim 14 wherein the step of selecting records to store in the slots of the bin includes the step of searching for a selection function for selecting the records.

16. The method of claim 15 wherein the step of selecting records and a slot assignment function includes the steps of iteratively selecting various sets of records to store into the slots of the bin until a perfect hashing function for the selected set of records is found.

17. The method of claim 11 wherein the keys are variable length and including the step of mapping the variable length keys to fixed length keys using a perfect hashing function.

18. The method of claim 17 wherein the fixed length key has a number of bits that is approximately equal to 2* log(number of keys)/log(2).

19. The method of claim 11 wherein the number of bins in a level is a power of two and the number of slots in a bin is a power of two.

20. The method of claim 11 wherein each record contains one of two values and each bin contains two slots, wherein the step of selecting a slot assignment function for assigning the selected records to slots of the bin includes the step of selecting a perfect hashing function such that all selected records of one value are assigned to one slot and all selected records of the other value are assigned to the other slot, and including the step of suppressing storing the selected record in its assigned slot.

21. The method of claim 11 including the step of selecting a slot assignment function for assigning the selected records to the slots includes the step of selecting a non-perfect hashing function so that records with the same data hash to the same slot.

22. The method of claim 11 wherein the records are variable length, and before repeating the steps logically dividing each record into fixed length sub-records and generating a sub-key for each key and repeating the steps using the sub-keys and sub-records.

23. The method of claim 11 wherein the step of selecting records to store in the slots of the bin includes the step of searching for a selection function for selecting the records.

24. A method in a computer system for assigning a plurality of keys to slots in storage of the computer system, the method comprising repeating the following computer-implemented steps until each key is assigned to a slot:
   selecting a number of bins, each bin having a plurality of slots;
   tentatively assigning each of the keys not yet assigned to a slot to one of the selected bins; and
   for each of the selected bins,
      selecting a subset of the keys tentatively assigned to the selected bin;
      attempting to generate a perfect hashing function for assigning the selected subset of keys to slots of the selected bin;
      repeating the steps of selecting a subset and attempting to generate a perfect hashing function until a perfect hashing function is generated for a selected subset of the keys; and
      assigning the subset of keys to slots of the selected bin in accordance with the generated perfect hashing function.

25. The method of claim 24 wherein the step of selecting a subset of keys includes the step of generating a bin assignment function for indicating the selected subset of the keys.

26. The method of claim 25 wherein each key has an associated record and including the step of storing the record associated with a key into the slot assigned to the key.

27. The method of claim 26 including the step of storing an indication of each bin assignment function and perfect hashing function so that the record for a key can be retrieved using the bin assignment functions and perfect hashing functions.

28. The method of claim 24 wherein each key has an associated record and wherein each record contains one of two values and each bin contains two slots, wherein the step of attempting to generate a perfect hashing function includes the step of selecting a perfect hashing function such that all the keys of the selected subset with records of one value are assigned to one slot and all the keys of the selected subset with records of the other value are assigned to the other slot, so that when retrieving records, the value of a record is the result of the selected perfect hashing function.

29. The method of claim 24 wherein each key has an associate record and including the step of attempting to generate a perfect hashing function includes the step of selecting a non-perfect hashing function when records with the same data hash to the same slot.

30. A computer system for storing records in storage, each record having a key, the storage having slots, each slot for containing a record, the slots being organized into bins, the bins being organized into levels, the computer system comprising:
   means for selecting a next level when all the keys have not yet been assigned to a slot;
   means for tentatively assigning each key not yet assign to a slot to a bin within the selected level;
   means for selecting a subset of the keys tentatively assigned to a bin;
   means for selecting a hashing function for the bin;
   means for determining whether the selected hashing function is a perfect hashing function for assignment of the selected subset of the keys to slots within the bin; and
   means for storing the records associated with the selected subset of the keys into the slots of the bin in accordance with the determined perfect hashing function.

31. The computer system of claim 30 wherein the means for selecting a subset of the keys includes means for selecting a bin assignment function for indicating the selection.

32. A computer-readable medium encoded with a data structure containing a plurality of records, each record having a key, the data structure comprising:
   a slot table having plurality of levels, each level having a plurality of bins, each bin having a plurality of slots, each slot for containing a record;
   a seed table, the seed table containing an indication of a bin assignment function and a slot assignment function for each bin in each level, the bin assignment functions for indicating which records are assigned to a bin, and the slot assignment function for assigning each record that is assigned to a bin to a slot within the bin.

33. The computer-readable medium of claim 32 wherein the data structure further includes a count of bins table having an entry for each level, each entry indicating the number of bins in the level.

34. The computer-readable medium of claim 32 wherein the indications of the bin assignment functions and the slot assignment functions are interleaved within the slot table.

35. A method in a computer system for encrypting associations between secure keys and associated records, the method comprising the steps of:
   tentatively assigning each secure key not yet assigned to a slot to one of a plurality of bins within a level, each bin having a plurality of slots for storing records;

for each bin within the level, selecting a slot assignment function for assigning a subset of the tentatively assigned secure keys to slots within the bin, assigning each secure key of the subset to a slot within the bin, storing within each assigned slot the associated record, and storing an indication of the selected slot assignment function; and repeating the above steps for subsequent levels until each secure key is assigned to a slot.

36. The method of claim 35 wherein the step of selecting a slot assignment for a subset further includes the step of iteratively selecting a bin assignment function for selecting a subset of the tentatively assigned secure keys, and determining whether a potential slot assignment function is to be selected and storing an indication of the bin assignment function corresponding to the selected slot assignment function.

37. The method of claim 36 including the step of retrieving the record associated with a designated secure key by repeating the steps of:

for each level until the record is retrieved,
determining the bin within the level to which the designated secure key was tentatively assigned;
retrieving the indication of the bin assignment function;
using the indicated bin assignment function, determining whether the designated secure key was assigned to a slot within the determined bin; and
when the designated secure key was assigned to a slot within the determined bin,
retrieving the indication of the slot assignment function;
using the indicated slot assignment function, determining to which slot the designated secure key was assigned; and
retrieving the stored record from the determined slot.

38. A method in a computer system for storing prefixes for words in a dictionary into storage of the computer system, the words having elements of an alphabet, the method comprising the steps of:

generating successor data structure corresponding to each prefix of a word in the dictionary, each successor data structure indicating the elements of the alphabet such that the corresponding prefix combined with each of the indicated elements are also a prefix of a word in the dictionary; and repeating the following steps until all the generated successor data structures are stored in storage,
selecting a number of slots in storage and designating the selected slots as a level;
selecting prefixes to assign to slots of the level and a slot assignment function for assigning the selected prefixes to slots with the level; and
storing the generated successor data structure associated with a prefix into the slot assigned by the slot assignment function.

39. The method of claim 38 wherein the step of selecting prefixes and a slot assignment function includes the steps of iteratively selecting various sets of prefixes to assign to the slots of the level until a slot assignment function that is a perfect hashing function for the selected prefixes is found.

40. The method of claim 38 wherein each successor data structure is an array with an entry for each element in the alphabet.

41. The method of claim 40 including the step of encoding the successor data structures in a variable length code based on frequency and wherein the step of storing the generated successor data structure stores the encoding.

42. The method of claim 38 wherein the step of selecting prefixes to assign to the slots of the level and a slot assignment function further includes the steps of:

logically dividing the level into bins, each bin having a plurality of slots;
assigning each of the selected prefixes to a bin; and
for each bin, selecting a slot assignment function for assigning the prefixes assigned to the bin to slots within the bin.

43. The method of claim 38 wherein the step of selecting prefixes to assign to the slots of the level includes the step of searching for a selection function for selecting the prefixes.

44. A method in a computer system for determining whether an element is a successor element of a designated prefix of a word in a dictionary, the computer system having storage containing a successor data structure for each prefix of a word in the dictionary, the storage being organized into levels, each level having bins, each bin having a slot for containing a successor data structure, the storage having indications of a bin assignment function and a slot assignment function for each bin within each level, the successor data structures being stored in slots in accordance with the indicated bin assignment and slot assignment functions, the method comprising the steps of:

repeating the following steps for each level until the successor data structure of the designated prefix is retrieved from storage,
determining to which bin within the level the successor data structure for the designated prefix may be stored;
retrieving the indication of the bin assignment function for the determined bin;
performing the bin assignment function as indicated to determine whether the successor data structure for the designated prefix is stored within the determined bin; and
when the bin assignment function indicates that the successor data structure for the designated prefix is stored in the determined bin,
retrieving the indication of the slot assignment function for the determined bin;
performing the slot assignment function as indicated to determine the slot in which the successor data structure is stored; and
retrieving the successor data structure from the determined slot.

45. The method of claim 44 wherein the storage contains a count of bins indicating the number of bins in each level, and wherein the step of determining to which bin within the level the successor data structure for the designated prefix may be stored includes the step of using the count of bins to determine the number of bins in a level.

46. A method in a computer system for retrieving a record from a data structure stored in storage, each record having a key, the storage being organized into levels, each level having bins, each bin having slots, each slot for containing a record, the storage having indications of a bin assignment function and a slot assignment function for each bin within each level, the records being assigned to slots in accordance with the indicated bin assignment and slot assignment functions, the bin assignment functions and slot assignment function assigning slots based on the keys, the method comprising the steps of:

receiving the key for the record to be retrieved; and
repeating the following steps for each level until the record is retrieved from storage, determining to which bin within the level the record for the received key may be stored;

retrieving the indication of the bin assignment function for the determined bin;

performing bin assignment function as indicated to determine whether the record to be retrieved is stored in the bin; and when the bin assignment function indicates that the record to be retrieved is stored in the determined bin, retrieving the indication of the slot assignment function for the determined bin;

performing the slot assignment function as indicated to determine the slot in which the record to be retrieved is stored; and retrieving the record from the determined slot.

47. A computer-readable medium containing computer instructions for causing a computer system to store data in storage of the computer system, the data organized into records, each record having a key, the storage organized into slots, each slot for storing a record, by the steps of:

selecting a number of slots and designating the selected slots as a level;

iteratively selecting from among the records not yet assigned to slots different sets of records to store into the selected slots of the level and searching for a perfect hashing function for assigning the selected records to the slots of the level based on the keys of the selected records until a perfect hashing function is found and selected;

assigning the selected records to the selected slots in accordance with the selected perfect hashing function;

storing each selected record in its assigned slot; and repeating the above steps for records not yet assigned to a slot until all the records are assigned to a slot.

48. The computer-readable medium of claim 47 wherein the step of selecting records and a perfect hashing function includes the steps of iteratively selecting various sets of records to store into the slots of the level until a perfect hashing function for the selected set of records is found.

49. The computer-readable medium of claim 47 wherein the keys are variable length and including the step of mapping the variable length keys to fixed length keys using a perfect hashing function.

50. The computer-readable medium of claim 49 wherein the fixed length key has a number of bits that is approximately equal to $$2* \log(\text{number of keys})/\log(2).$$

51. The computer-readable medium of claim 47 wherein the number of slots in a level is a power of two.

52. The computer-readable medium of claim 47 including the step of storing an indication of each perfect hashing function selected.

53. The computer-readable medium of claim 47 wherein each record contains one of two values and each level contains two slots, wherein the step of selecting a perfect hashing function for assigning the selected records to the selected slots includes the step of selecting a perfect hashing function such that all selected records of one value are assigned to one slot and all selected records of the other value are assigned to the other slot, and including the step of suppressing storing each selected record in an assigned slot.

54. The computer-readable medium of claim 47 including the step of selecting a perfect hashing function for assigning the selected records to the selected slots includes the step of selecting a non-perfect hashing function when records with the same data hash to the same slot.

55. The computer-readable medium of claim 47 wherein the records are variable length, and before repeating the steps logically dividing each record into fixed length sub-records and generating a sub-key for each key and repeating the steps using the sub-keys and sub-records.

56. The computer-readable medium of claim 47 wherein the step of selecting records to store in the slots of the level and a perfect hashing function further includes the steps of:

logically dividing the level into bins, each bin having a plurality of slots;

assigning each of the selected records to a bin; and for each bin, selecting a perfect hashing function for assigning the records assigned to the bin to slots within the bin.

57. The computer-readable medium of claim 47 wherein the step of selecting records to store in the slots of the level includes the step of searching for a selection function for selecting the records.

58. A computer-readable medium containing computer instructions for causing a computer system to store dam in storage of the computer system, the data organized into records, each record having a key, the storage organized into slots, each slot for storing a record, by the steps of:

repeating the following steps until each record is stored in a slot, selecting a number of slots and designating the selected slots as a level, the slots within a level being organized into bins; and for each bin of the level, iteratively selecting records to store in the slots of the bin and searching for a slot assignment function for assigning the selected records to the slots of the bin based on the keys;

assigning the selected records to the slots of the bin in accordance with the selected slot assignment function;

storing the selected record in its assigned slot; and storing an indication of the selected slot assignment function.

59. The computer-readable medium of claim 58 wherein the step of selecting records and a slot assignment function includes the steps of iteratively selecting various sets of records to store into the slots of the bin until a perfect hashing function for the selected set of records is found.

60. The computer-readable medium of claim 58 including the step of for each bin of the level, tentatively assigning each record not yet stored in an assigned slot to a bin and wherein the step of selecting records to store in the slots of the bin selects records from the records tentatively assigned to the bin.

61. The computer-readable medium of claim 58 wherein the keys are variable length and including the step of mapping of the variable length keys to fixed length keys using a perfect hashing function.

62. The computer-readable medium of claim 58 wherein the number of bins in a level is a power of two and the number of slots in a bin is a power of two.

63. The computer-readable medium of claim 58 wherein each record contains one of two values and each bin contains two slots, wherein the step of selecting a slot assignment function for assigning the selected records to slots of the bin includes the step of selecting a perfect hashing function such that all selected records of one value are assigned to one slot and all selected records of the other value are assigned to the other slot, and including the step of suppressing storing the selected record in its assigned slot.

64. The computer-readable medium of claim 58 including the step of selecting a slot assignment function for assigning the selected records to the slots includes the step of selecting a non-perfect hashing function so that records with the same data hash to the same slot.

65. The computer-readable medium of claim 58 wherein the records are variable length, and before repeating the steps logically dividing each record into fixed length sub-records and generating a sub-key for each key and repeating the steps using the sub-keys and sub-records.

66. The computer-readable medium of claim 58 wherein the step of selecting records to store in the slots of the bin includes file step of searching for a selection function for selecting the records.

67. A computer-readable medium containing computer instructions for causing a computer system to assign a plurality of keys to slots in storage of the computer system by repeating the following steps until each key is assigned to a slot:

selecting a number of bins, each bin having a plurality of slots;

tentatively assigning each of the keys not yet assigned to a slot to one of the selected bins; and for each of the selected bins,
  selecting a subset of the keys tentatively assigned to the selected bin;
  attempting to generate a perfect hashing function for assigning the selected subset of keys to slots of the selected bin;
  repeating the steps of selecting a subset and attempting to generate a perfect hashing function until a perfect hashing function is generated for a selected subset of the keys; and
  assigning the subset of keys to slots of the selected bin in accordance with the generated perfect hashing function.

68. The computer-readable medium of claim 67 wherein the step of selecting a subset of keys includes the step of generating a bin assignment function for indicating the selected subset of the keys.

69. The computer-readable medium of claim 67 wherein each key has an associated record and including the step of storing the record associated with a key into the slot assigned to the key.

70. The computer-readable medium of claim 67 including the step of storing an indication of each bin assignment function and perfect hashing function so that the record for a key can be retrieved using the bin assignment functions and perfect hashing functions.

* * * * *